United States Patent
Yi et al.

(10) Patent No.: US 8,335,201 B2
(45) Date of Patent: Dec. 18, 2012

(54) CALL CONTROL METHOD, COMMUNICATION SYSTEM, AND RELEVANT DEVICES

(75) Inventors: Zhiquan Yi, Shenzhen (CN); Hongming Chen, Shenzhen (CN); Guihua Li, Shenzhen (CN); Qingchun Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 218 days.

(21) Appl. No.: 12/823,645

(22) Filed: Jun. 25, 2010

(65) Prior Publication Data
US 2011/0110298 A1    May 12, 2011

Related U.S. Application Data

(63) Continuation of application No. PCT/CN2008/073754, filed on Dec. 26, 2008.

(30) Foreign Application Priority Data

Dec. 27, 2007 (CN) .......................... 2007 1 0300293
Feb. 2, 2008 (CN) .......................... 2008 1 0009165

(51) Int. Cl.
*H04W 4/00* (2009.01)
*H04L 12/28* (2006.01)

(52) U.S. Cl. .......................... 370/341; 370/431; 455/403
(58) Field of Classification Search .................. 370/310, 370/328, 341, 351, 352, 400, 401, 431; 455/403
See application file for complete search history.

(56) References Cited

U.S. PATENT DOCUMENTS

| 6,507,645 | B1 * | 1/2003 | Leitgeb et al. | 379/201.12 |
| 7,684,795 | B2 * | 3/2010 | Salmivalli et al. | 455/433 |
| 7,912,198 | B2 * | 3/2011 | Zhang et al. | 379/207.16 |
| 2009/0029697 | A1 * | 1/2009 | Bianconi et al. | 455/432.3 |

FOREIGN PATENT DOCUMENTS

| CN | 1635749 A | 7/2005 |
| CN | 1917532 A | 2/2007 |
| CN | 101227736 A | 7/2008 |
| CN | 101227736 B | 7/2008 |
| CN | 1774014 A | 3/2009 |
| GB | 2385683 A | 8/2008 |
| WO | WO 03-024143 A1 | 3/2003 |

OTHER PUBLICATIONS

European Patent Office, Extended European Search Report in European Application No. 08 868 194.5-1244 (Jan. 23, 2012).

(Continued)

*Primary Examiner* — Kerri Rose
(74) *Attorney, Agent, or Firm* — Leydig, Voit & Mayer, Ltd.

(57) ABSTRACT

A call control method, a communication system, and relevant devices are provided so that communications can be implemented under different network conditions based on the same number. The method includes: receiving a call request of a calling terminal, where the call request carries a called terminal number; querying a Home Location Register (HLR) of a called terminal according to the called terminal number; obtaining a Supplementary Service Code (SS_Code) from the HLR, where the SS_Code carries a Mobile Station International ISDN Number (MSISDN)-based IP Multimedia Subsystem (IMS) service identifier; and triggering an Application Server (AS) to implement an MSISDN-based IMS service according to the MSISDN-based IMS service identifier. A communication system and relevant devices are also provided.

8 Claims, 7 Drawing Sheets

OTHER PUBLICATIONS

Written Opinion of the International Searching Authority in corresponding PCT Application No. PCT/CN2008/073754 (Mar. 19, 2009).

State Intellectual Property Office of the People's Republic of China, International Search Report in International Patent Application No. PCT/CN2008/073754 (Dec. 26, 2008).

* cited by examiner

CALL CONTROL METHOD, COMMUNICATION SYSTEM, AND RELEVANT DEVICES

CROSS-REFERENCE TO RELATED APPLICATIONS

This application is a continuation of International Application No. PCT/CN2008/073754, filed on Dec. 26, 2008, which claims priorities to Chinese Patent Application No. 200810009165.X, filed on Feb. 2, 2008, and Chinese Patent Application No. 200710300293.5, filed on Dec. 27, 2007, all of which are incorporated herein by reference in their entireties.

FIELD OF THE INVENTION

The present invention relates to the communication field, and in particular, to a call control method, a communication system, and relevant devices.

BACKGROUND OF THE INVENTION

With the development of the communication industry and the Internet industry, the communication industry and the Internet industry penetrate into each other to derive new services and applications. In the development process, services and applications are oriented to users. In the user communication, a unified communication number is the core identification mode.

The unified communication number technology provides interworking of the same number and unified communications between two networks. A unified communication number technology in the conventional art is:

Through a one-number service, multiple terminals are bound to one number. Specifically, the system allocates a one-number service number which is bound to multiple terminals such as a fixed phone, a Personal Handyphone System (PHS) and so on. When a calling party dials the one-number service number, the system connects the call to the called party who holds the multiple terminals which ring simultaneously or sequentially. In this way, the calling party can dial the one-number service number to reach different terminals of the called party, and the called party needs to tell only a unified number to the outside.

However, in the process of developing the present invention, the inventor finds at least the following defects in the conventional art: in the one-number service in the conventional art, the system needs to allocate a new number different from all existing numbers of the user to the user.

In addition, when the calling party uses a user terminal (such as a fixed phone, a PHS, or a mobile terminal) to make a call to the called party, the called terminal displays the calling number of the calling terminal that originates the call rather than the one-number service number, and therefore, the called party is unable to dial the one-number service number of the calling party back to the calling party directly.

SUMMARY OF THE INVENTION

A call control method, a communication system, and relevant devices are provided in embodiments of the present invention so that communications can be implemented under different network conditions based on the same number.

A call control method provided in an embodiment of the present invention includes:

receiving a call request of a calling terminal, where the call request carries a called terminal number;

querying a Home Location Register (HLR) of a called terminal according to the called terminal number;

obtaining a Supplementary Service Code (SS_Code) from the HLR, where the SS_Code carries a Mobile Station International ISDN Number (MSISDN)-based IMS service identifier; and triggering an Application Server (AS) to implement an MSISDN-based IMS service according to the MSISDN-based IMS service identifier.

A communication system provided in an embodiment of the present invention includes:

a Mobile Switching Center (MSC), adapted to: request an SS_Code from an HLR of a called terminal according to a called terminal number carried in a call originated by a calling terminal, and originate a call to a Gateway Mobile Switching Center (GMSC) according to an MSISDN-based IMS service identifier in the SS_Code;

the HLR, adapted to feed back the SS_Code of the corresponding called terminal to the MSC according to the request sent by the MSC;

the GMSC, adapted to trigger an AS to implement an MSISDN-based IMS service according to the call of the MSC; and the AS, adapted to implement the MSISDN-based IMS service as triggered by the GMSC.

An MSC provided in an embodiment of the present invention includes:

a call receiving unit, adapted to receive a call originated by a calling terminal, where the call carries a called terminal number;

an obtaining unit, adapted to obtain a corresponding SS_Code from the HLR of the called party according to the called terminal number carried in the call received by the call receiving unit; and an MSISDN-based IMS service triggering unit, adapted to trigger the MSISDN-based IMS service according to the SS_Code obtained by the obtaining unit.

An HLR provided in an embodiment of the present invention includes:

an MSISDN-based IMS service subscription controlling unit, adapted to: subscribe to an MSISDN-based IMS service as required by a user, and set an MSISDN-based IMS service identifier in an SS_Code;

a request receiving unit, adapted to receive a GET request from an MSC, where the GET request carries a called terminal identifier;

a querying unit, adapted to query the service subscription attribute of the corresponding SS_Code according to the called terminal identifier carried in the GET request received by the request receiving unit; and a request feedback unit, adapted to feed back the SS_Code found by the querying unit to the MSC.

Compared with the prior art, the embodiments of the present invention provide the following benefits:

In the embodiments of the present invention, the MSC of the called party (hereinafter referred to as the terminating MSC) receives a call from the calling terminal, determines the HLR of the called terminal according to the called MSISDN carried in the call, obtains an SS_Code from the HLR, and triggers the MSISDN-based IMS service of the AS according to the MSISDN-based IMS service attribute in the SS_Code; and the AS connects the call to the mobile terminal and/or Internet Protocol (IP) client of the called party through a voice gateway. Therefore, in the embodiments of the present invention, the MSISDN of the called party may serve as a unified number; when a calling party dials this MSISDN, the call may be connected to the mobile terminal and/or IP client of the called party according to the setting of the called party, and no new unified number needs to be allocated. Moreover, in the case of dialing the number back, the call can also be connected to the mobile terminal and/or IP client of the called party. Therefore, communications are implemented under different network conditions based on the same number.

DETAILED DESCRIPTION OF THE INVENTION

A call control method, a communication system, and relevant devices are provided in the embodiments of the present invention so that communications can be implemented under different network conditions based on the same number.

In the embodiments of the present invention, the terminating MSC receives a call from the calling mobile terminal, determines the HLR of the called party according to the called MSISDN carried in the call, obtains an SS_Code from the HLR, and triggers the MSISDN-based IMS service of the AS according to the MSISDN-based IMS service attribute in the SS_Code; and the AS connects the call to the mobile terminal and/or IP client of the called party through a voice gateway. Therefore, in the embodiments of the present invention, the MSISDN may serve as a unified number; when a calling party dials this MSISDN, the call may be connected to the mobile terminal and/or IP client of the called party according to the setting of the called party, and no new unified number needs to be allocated. Moreover, in the case of dialing the number back, the call can also be connected to the mobile terminal and/or IP client of the called party. Therefore, communications are implemented under different network conditions based on the same number.

Figure 1:
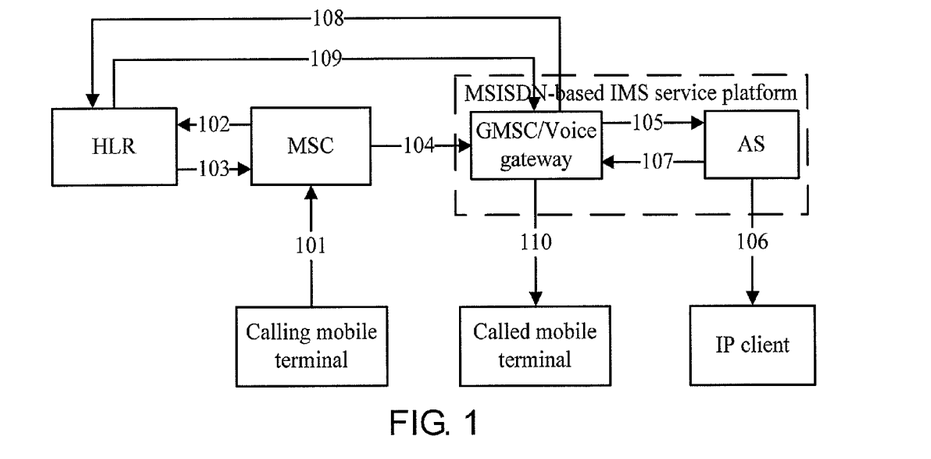
FIG. 1 shows a process of implementing a call control method in an embodiment of the present invention.

The call control method in this embodiment is detailed below. As shown in FIG. 1, the process of implementing the call control method includes the following steps:

101. The calling mobile terminal dials an MSISDN (the user of the MSISDN has subscribed to the MSISDN-based IMS service). The call is routed to the MSC of the calling party through a signaling message.

In this embodiment, the call may also be routed to the GMSC of the calling party through a signaling message. In the subsequent embodiments, the MSC is taken as an example. It is understandable that the MSC may be a GMSC instead.

In this embodiment, if a user has subscribed to the MSISDN-based IMS service, the HLR of the user sets the MSISDN-based IMS service identifier into the SS_Code for indicating that the user has subscribed to the MSISDN-based IMS service. The SS_Code is transmitted as a reserved bit in the existing call process. The SS_Code may further carry the identifier of other services subscribed to by the user. For example, if the user has subscribed to the Ring Back Tone (RBT) service, the HLR may set the RBT service identifier into the SS_Code.

In the existing call process, the identifier of the Multimedia Ring Back Tone (MRBT) service is 252, and the identifier of the ordinary RBT service is 254. Therefore, in this embodiment, the identifier of the MSISDN-based IMS service may be set to 251. It is understandable that the identifier here is exemplary only, and may be any other identifier in practice.

102. The MSC queries the HLR of the called number, and requests the subscribed SS_Code of the called number from the HLR.

The MSC queries the HLR of the called number according to the called number provided by the call from the calling mobile terminal, and sends a request to the HLR.

In this embodiment, the MSC requests the subscribed SS_Code of the called number from the HLR. If the user has subscribed to the MSISDN-based IMS service, the SS_Code carries the MSISDN-based IMS service identifier; if the user has subscribed to the RBT service, the SS_Code carries the RBT service identifier.

103. The HLR feeds back the SS_Code to the MSC.

After receiving the request of the MSC, the HLR queries the SS_Code corresponding to the called terminal according to the called terminal information carried in the request, and feeds back the found attribute to the MSC.

104. The MSC triggers the MSISDN-based IMS service according to the SS_Code subscription attribute returned by the HLR, and sends the MSISDN-based IMS service information to the GMSC of the MSISDN-based IMS service platform according to the routing policy.

In this embodiment, the called terminal has been subscribed to the MSISDN-based IMS service. That is, the SS_Code carries the MSISDN-based IMS service identifier. If the user has not subscribed to the RBT service, the SS_Code carries no RBT service identifier; if the user has subscribed to the RBT service, the SS_Code carries an RBT service identifier.

If the SS_Code carries no RBT service identifier but carries the MSISDN-based IMS service identifier only, the MSC determines that the current call needs to trigger the MSISDN-based IMS service of the called terminal according to the MSISDN-based IMS service identifier in the SS_Code, and sends the MSISDN-based IMS service information to the GMSC of the MSISDN-based IMS service platform according to the preset routing policy.

If the SS_Code carries an RBT service identifier or any other service identifier, and further carries the MSISDN-based IMS service identifier, the MSC chooses to trigger the service with the highest priority according to the service priority information. It should be noted that the service priority information may be set by the HLR when the user customizes the service. In this embodiment, the MSISDN-based IMS service of the user is a primary concern, and therefore, the HLR sets the highest priority for the MSISDN-based IMS service. After obtaining the SS_Code, the MSC determines that the service with the highest priority is the MSISDN-based IMS service currently according to the order of priority, and therefore, sends the MSISDN-based IMS service information to the GMSC of the MSISDN-based IMS service platform according to the preset routing policy.

In the process described above, the MSC determines the trigger sequence. It is understandable that the trigger sequence setting may also be made on the HLR. For example, after receiving a request of the MSC, the HLR judges whether the user corresponding to the request has subscribed to the MSISDN-based IMS service; and, if the user corresponding to the request has subscribed to the MSISDN-based IMS service, the HLR feeds back the SS_Code to the MSC directly without the necessity of judging whether the user has subscribed to other services. In this case, the SS_Code carries only the MSISDN-based IMS service identifier, and the MSC does not need to perform priority triggering after receiving the SS_Code.

105. The GMSC triggers the MSISDN-based IMS service of the called party to the AS through a voice gateway.

After receiving the MSISDN-based IMS service information from the MSC, the GMSC triggers the AS to implement the MSISDN-based IMS service.

106. Through the IP network, the AS connects the call to the IP client specified in the MSISDN-based IMS service of the called terminal.

The IP client may be a personal computer, or any other intelligent IP network terminal.

Specifically, the AS queries the physical port number of the IP client corresponding to the called terminal, and connects the call to the IP client through this physical port.

107. The AS sends a secondary connection request to the GMSC.

The AS delivers the MSISDN of the called party to the IP client, with the specific service identifier being carried in a signaling message or a prefix. The secondary connection request that carries the specific service identifier is sent to the GMSC. The specific service identifier indicates that the GMSC needs to connect the call to the called terminal directly after obtaining the SS_Code, without triggering other services in the SS_Code.

108. The GMSC queries the HLR for the SS_Code.

After receiving the secondary connection request from the AS, the GMSC sends a GET request to the HLR, requesting to obtain the SS_Code.

109. The HLR feeds back the SS_Code to the GMSC.

110. The GMSC performs secondary connection.

The GSMC receives the SS_Code (which may carry the MSISDN-based IMS service identifier and other service identifiers of this number) from the HLR. According to the specific service identifier delivered by the AS, the GMSC determines that the call needs to be connected to the called terminal directly, without the necessity of triggering other services in the SS_Code. Therefore, the GMSC connects the called roaming number to the MSC of the called party, and finally, the MSC of the called party connects the call to the called mobile terminal.

In this embodiment, step 106 and step 110 show that the calling mobile terminal may connect the call to the mobile terminal and the IP client of the called party directly according to the MSISDN of the called party. In this case, the ring mode of the mobile terminal and the IP client of the called party may be set by the called party. That is, the called party may set the ring mode in the AS. The ring modes include: The mobile terminal and the IP client ring simultaneously; only the mobile terminal rings; only the IP client rings; and the mobile terminal and the IP client ring sequentially. If the mobile terminal and the IP client ring simultaneously, the IP client does not ring immediately after the call is connected to the IP client in step 106; instead, the called mobile terminal and the IP client ring simultaneously after the call is connected to the called mobile terminal in step 110. Other processing modes may be inferred accordingly, and are not described further.

Figure 2A:
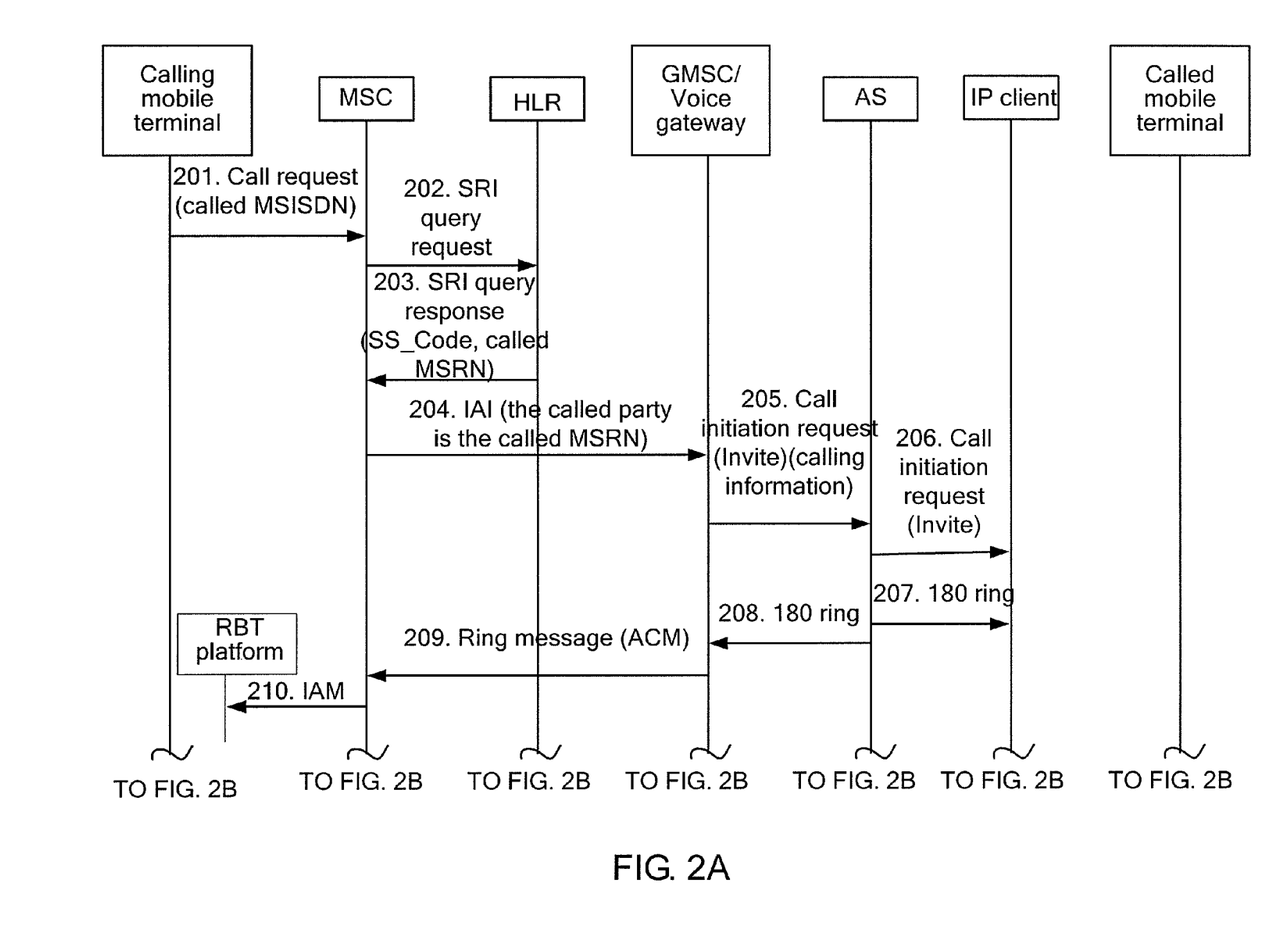
FIG. 2 is a signaling flowchart of a call control method in a first embodiment of the present invention.
Figure 2B:
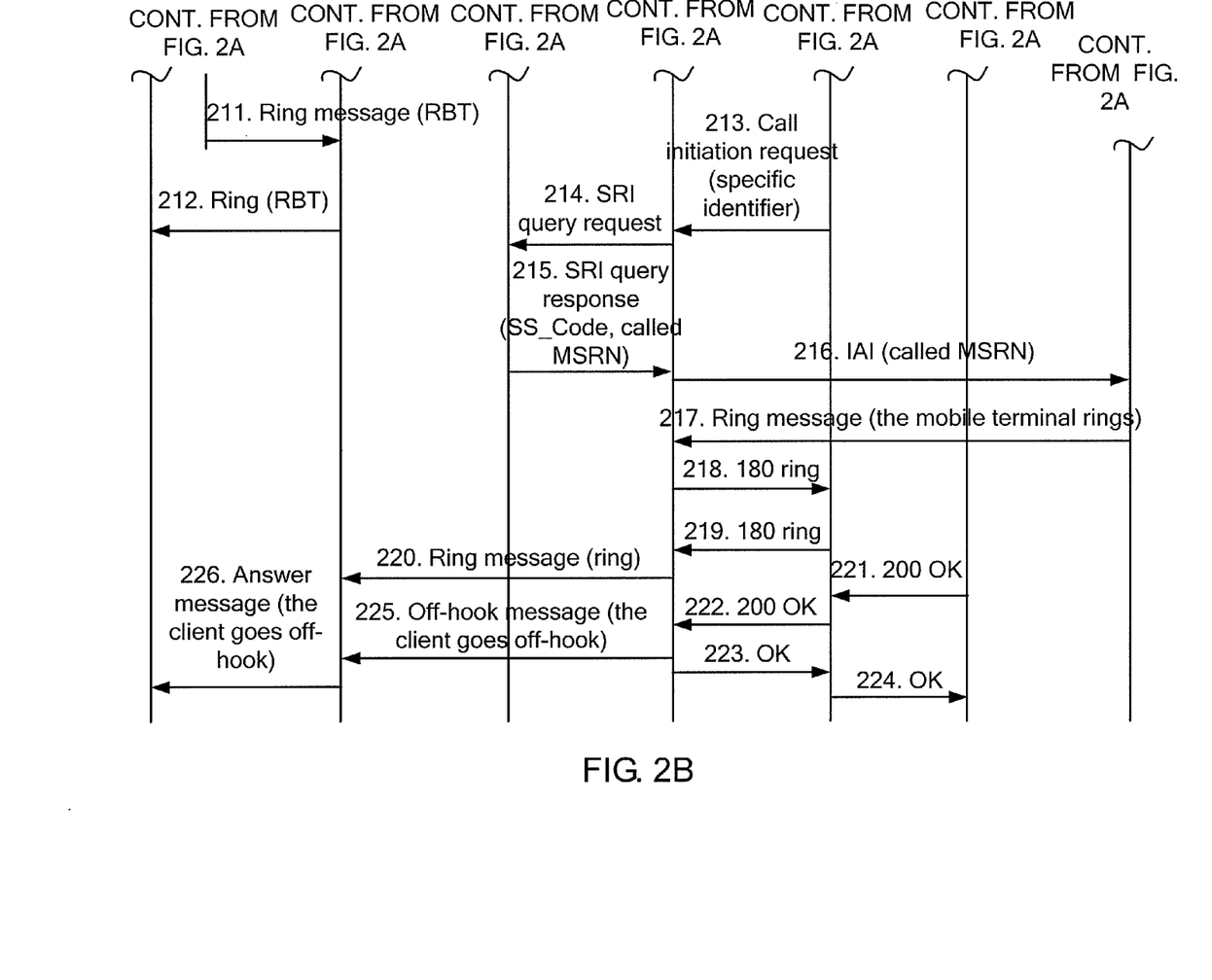

As described in the foregoing embodiment, the GMSC needs to obtain the SS_Code from the HLR after receiving the secondary connection request of the AS. In practice, if the GMSC can obtain the information required for connecting the call to the called mobile terminal beforehand, it is not necessary to obtain the SS_Code from the HLR. The specific processing mode is detailed below:

I. Scenario where secondary triggering needs to be avoided:

As shown in FIG. 2, the signaling flow of the call control method in the first embodiment of the present invention includes the following steps:

201. The calling mobile terminal sends a call request to the MSC.

In this embodiment, the calling mobile terminal sends a call request "Setup" to the MSC. This call request carries the MSISDN of the called party. It should be noted that in the practical call process, the calling mobile terminal sends a call request to the MSC of the calling party (hereinafter referred to as the originating MSC), and then the originating MSC routes the call to the terminating MSC through each communication network element. If the calling mobile terminal and the called mobile terminal are covered by the same MSC, it is not necessary to distinguish the originating MSC from the terminating MSC. The specific routing process is based on the conventional art, and is not described further.

It should be noted that when the user subscribes to the service, the HLR needs to subscribe to the service and make the service setting. That is, the SS_Code carries the service identifier, and the HLR sets the service priority order as follows: Termination-CAMEL Subscription Information (T-CSI) service, Call Forwarding (CF) service, MSISDN-based IMS service, and other services. In this embodiment and the subsequent embodiments, the processing of the T-CSI service and the CF service is not considered. Therefore, the service with the highest priority in the SS_Code is the MSISDN-based IMS service.

202. The terminating MSC sends a Service Request Instruction (SRI) query request to the HLR of the called party.

After receiving the call, the terminating MSC requests to query the HLR of the called party for the subscription attribute of the called terminal.

203. The HLR of the called party feeds back the subscription attribute of the called terminal.

After receiving the SRI query request from the terminating MSC, the HLR of the called party queries the subscription attribute corresponding to the called terminal, and feeds back all subscribed services and the called Mobile Subscriber Roaming Number (MSRN) to the terminating MSC. It should be noted that in this embodiment, the HLR of the called party feeds back the called MSRN to the terminating MSC. It is understandable that the HLR of the called party may not feed back the called MSRN to the terminating MSC.

204. The MSC sends an Initial Address Message with Additional Information (IAI) to the GMSC.

According to the SS_Code fed back by the HLR, the MSC determines the current service with the highest priority to be the MSISDN-based IMS service, which is identified as 251 (252 is the MRBT attribute; 254 is the ordinary RBT attribute; and currently, the available code range of the SS_Code is 241-255 bits). The MSC triggers the MSISDN-based IMS service firstly, and originates an IAI call and reports it to the GMSC in the core network. The number of the called party of the IAI call is the called MSRN.

It should be noted that if the HLR of the called party feeds back the called MSRN to the MSC, the MSC may use the called MSRN as the number of the called party of the IAI call, and route the call to the GMSC. If the HLR of the called party does not feed back the called MSRN to the MSC, the MSC originates an IAI call to the GMSC according to the preset call route. That is, in this embodiment, the MSRN may not be necessary when the MSC originates a call to the GMSC.

205. The GMSC sends a call initiation request (Invite) message to the AS.

After receiving the IAI call, the GMSC sends an MSISDN-based IMS service trigger request to the AS to trigger the AS to implement the MSISDN-based IMS service. In this embodiment, the MSISDN-based IMS service trigger request may be sent to the AS through a Session Initiation Protocol (SIP) Invite message.

This Invite message carries the information about the calling party, for example, the MSISDN of the calling party.

206. The AS connects the call to the IP client through a voice gateway (SoftSwitch).

The AS determines that the MSISDN-based IMS service needs to be triggered according to the Invite message sent by the GMSC. Therefore, the AS connects the call to the corresponding IP client according to the calling information in the request. It should be noted that the users who have subscribed to the MSISDN-based IMS service need to set their own IP clients. Therefore, the AS sets a correspondence between the MSISDN and the IP client. When the AS needs to trigger the MSISDN-based IMS service, the AS connects the call from the calling mobile terminal to the IP client corresponding to the called terminal.

207-208. The IP client feeds back a 180 Ring message which is then forwarded to the GMSC.

The IP client feeds back a 180 Ring message which is then fed back to the GMSC through the AS.

209. The GMSC feeds back an Address Complete Message (ACM) to the originating MSC.

After receiving the 180 Ring message, the GMSC converts the 180 Ring message into an ACM and transmits the ACM to the originating MSC transparently.

210. The originating MSC sends an Initial Address Message (IAM) to the RBT platform.

The originating MSC judges whether the SS_Code carries an RBT service identifier. If the SS_Code carries an RBT service identifier, the MSC originates an IAM call to the RBT platform. In this embodiment, it is assumed that the SS_Code carries an RBT service identifier.

211. The RBT platform feeds back an ACM to the originating MSC.

212. The originating MSC plays an RBT to the calling mobile terminal through the ACM.

In this embodiment, it is assumed that the SS_Code carries an RBT service identifier. It is understandable that if no RBT service identifier is carried, the originating MSC does not need to interact with the RBT platform, but needs to play an ordinary ring back tone to the calling mobile terminal directly.

213. The AS sends an Invite message that carries a specific service identifier to the GMSC.

In this embodiment, there are four ring modes in the MSISDN-based IMS service: The mobile terminal and the IP client ring simultaneously; only the mobile terminal rings; only the IP client rings; and the mobile terminal and the IP client ring sequentially. The ring mode in the process described above is: The IP client rings first. If the ring mode set by the user is that only the IP client rings, the mobile terminal ring process is not necessary.

Supposing the ring mode set by the user requires the mobile terminal to ring, the AS needs to send an Invite message that carries the specific service identifier to the GMSC. The specific service identifier is adapted to indicate that the GMSC does not need to trigger the service in the SS_Code after obtaining the SS_Code and the called MSRN from the HLR. Instead, the call is connected to the called mobile terminal directly according to the called MSRN. The specific service identifier may be a prefix or a protocol extension indication. For example, a prefix is added before the called number to indicate that the call is not a new call, but a call subsequent to the existing call in the MSISDN-based IMS service.

214. The GMSC sends an SRI query request to the HLR.

After receiving the Invite message of the AS, the GMSC sends a request for obtaining the SRI to the HLR of the called party. The SRI includes the SS_Code and the called MSRN.

215. The HLR feeds back the SRI to the GMSC.

After receiving the SRI query request of the GMSC, the HLR feeds back the SS_Code and the called MSRN to the GMSC.

216. The GMSC connects the call to the called mobile terminal according to the received called MSRN.

217. The called mobile terminal rings, and sends back an ACM.

218-226. The client or the called mobile terminal goes off-hook, and returns a 200 OK message or an Answer Message (ANM) to the terminating MSC. The message is forwarded to the calling party, and the call is connected between the calling party and the called party.

In the foregoing embodiment, the IP client rings first, and then the called mobile terminal rings. It is understandable that if the IP client and the called mobile terminal ring simultaneously, step 206 needs to be postponed and executed with step 213 so that the IP client and the called mobile terminal ring simultaneously. However, in order not to affect the user experience of the calling mobile terminal, the RBT may be played to the calling mobile terminal through the GMSC and the MSC after completion of step 208.

In the embodiments of the present invention, the terminating MSC receives a call from the calling mobile terminal, determines the HLR of the called party according to the called MSISDN carried in the call, obtains an SS_Code from the HLR, and triggers the MSISDN-based IMS service of the AS according to the MSISDN-based IMS service attribute in the SS_Code; and the AS connects the call to the mobile terminal and/or IP client of the called party through a voice gateway. Therefore, in the embodiments of the present invention, the MSISDN may serve as a unified number; when a calling party dials this MSISDN, the call may be connected to the mobile terminal and/or IP client of the called party according to the setting of the called party, and no new unified number needs to be allocated. Moreover, in the case of dialing the number back, the call can also be connected to the mobile terminal and/or IP client of the called party. Therefore, communications are implemented under different network conditions based on the same number.

Secondly, because the Invite message sent by the AS to the GMSC carries a specific service identifier, the GMSC can be prevented from triggering other services in the SS_Code. Therefore, process confusion caused by repeated triggering may be avoided.

Moreover, because the communication capability of the IP client is equivalent to or greater than that of the mobile terminal, the IP client based on the IP network may implement communications in place of the mobile terminal if mobile signals are unavailable or in the case of international roaming.

Figure 3A:
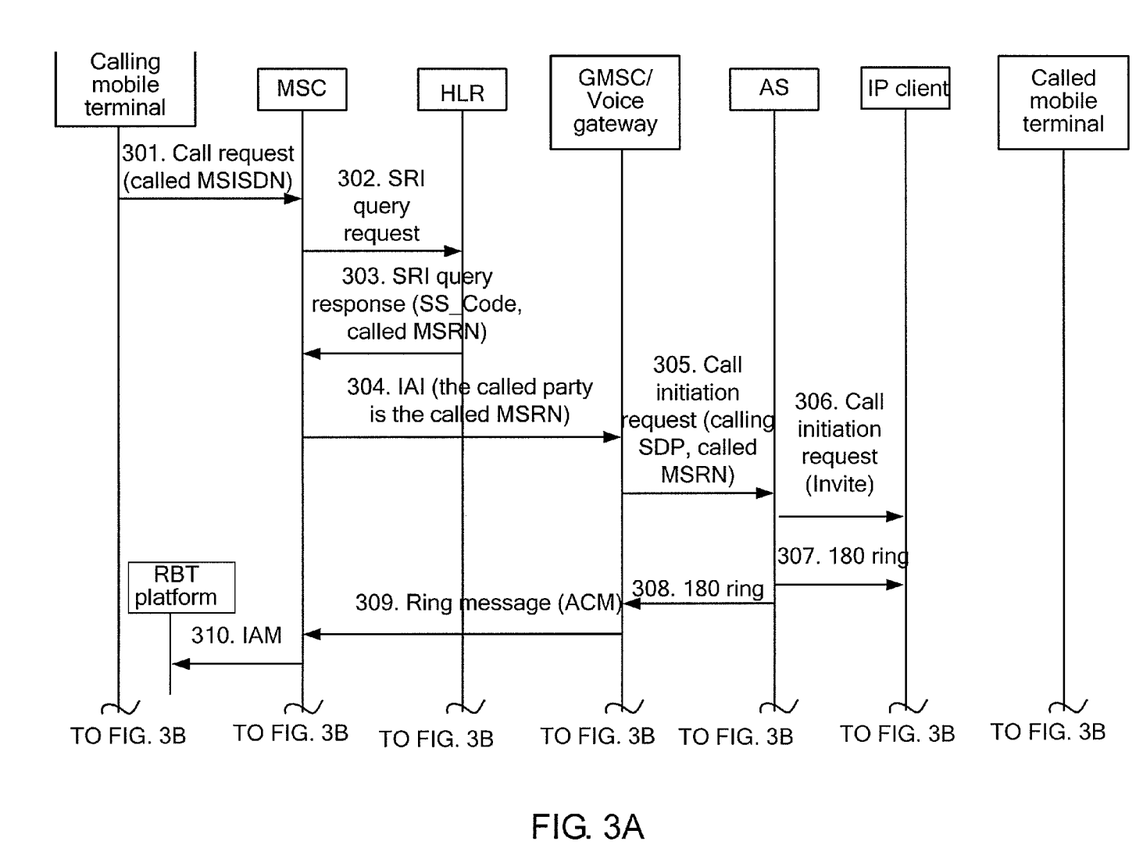
FIG. 3 is a signaling flowchart of a call control method in a second embodiment of the present invention.
Figure 3B:
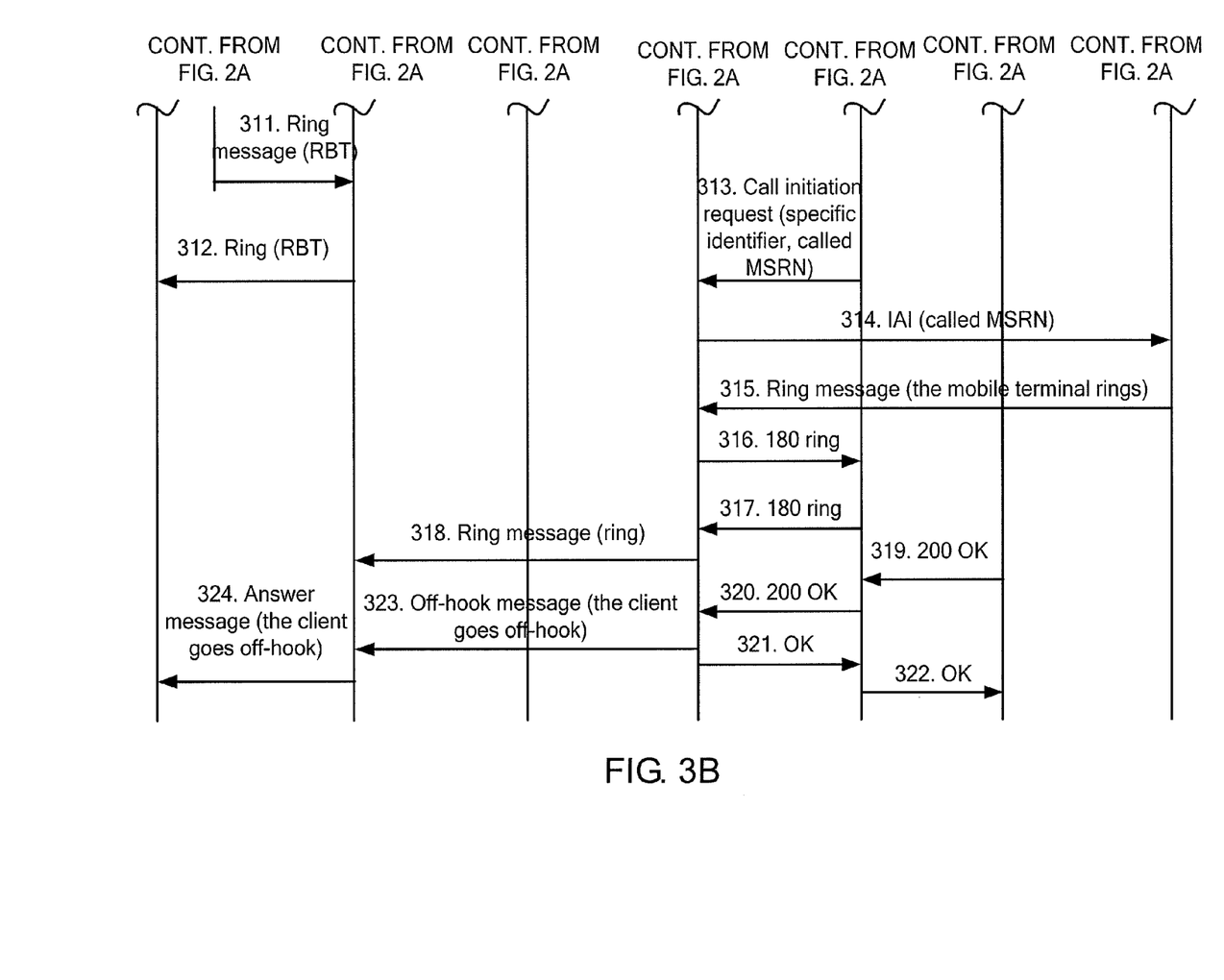

What is described above is an embodiment of a call control method which avoids secondary repeated triggering. Because the GMSC needs to obtain the SS_Code from the HLR, it is necessary to prevent the GMSC from triggering the services in the SS_Code repeatedly. In the method below, the GMSC does not need to obtain the SS_Code from the HLR:

II. Scenario where secondary triggering does not need to be avoided:

As shown in FIG. 3, the signaling flow of the call control method in the second embodiment of the present invention includes the following steps:

301. The calling mobile terminal sends a call request to the MSC.

In this embodiment, the calling mobile terminal sends a call request "Setup" to the MSC. This call request carries the MSISDN of the called party. It should be noted that in the practical call process, the calling mobile terminal sends a call request to the originating MSC, and then the originating MSC routes the call to the terminating MSC through each communication network element. If the calling mobile terminal and the called mobile terminal are covered by the same MSC, it is not necessary to distinguish the originating MSC from the terminating MSC. The specific routing process is based on the prior art, and is not described further.

It should be noted that when the user subscribes to the service, the HLR needs to subscribe to the service and make the service setting. That is, the SS_Code carries the service identifier, and the HLR sets the service priority order as follows: T-CSI service, CF service, MSISDN-based IMS service, and other services. In this embodiment and the subsequent embodiments, the processing of the T-CSI service and the CF service is not considered. Therefore, the service with the highest priority in the SS_Code is the MSISDN-based IMS service.

302. The terminating MSC sends an SRI query request to the HLR of the called party.

After receiving the call, the terminating MSC requests to query the HLR of the called party for the SRI, namely, for the subscription attribute of the called terminal.

303. The HLR of the called party feeds back the subscription attribute of the called terminal.

After receiving the SRI query request from the terminating MSC, the HLR of the called party queries the subscription attribute corresponding to the called terminal, and feeds back all subscribed services and the called MSRN to the terminating MSC. It should be noted that in this embodiment, the HLR of the called party feeds back the called MSRN to the terminating MSC. It is understandable that the HLR of the called party may not feed back the called MSRN to the terminating MSC.

304. The MSC sends an IAI message to the GMSC.

According to the SS_Code fed back by the HLR, the MSC determines the current service with the highest priority to be the MSISDN-based IMS service, which is identified as 251 (252 is the MRBT attribute; 254 is the ordinary RBT attribute; and currently, the available code range of the SS_Code is 241-255 bits). The MSC triggers the MSISDN-based IMS service firstly, and originates an IAI call and reports it to the GMSC in the core network. The number of the called party of the IAI call is the called MSRN.

After receiving the IAI message, the GMSC stores the called MSRN.

It should be noted that if the HLR of the called party feeds back the called MSRN to the MSC, the MSC may use the called MSRN as the number of the called party of the IAI call, and route the call to the GMSC. If the HLR of the called party does not feed back the called MSRN to the MSC, the MSC originates an IAI call to the GMSC according to the preset call route. That is, in this embodiment, the MSRN may not be necessary when the MSC originates a call to the GMSC.

305. The GMSC sends an Invite message to the AS.

After receiving the IAI call, the GMSC sends an MSISDN-based IMS service trigger request to the AS to trigger the AS to implement the MSISDN-based IMS service. In this embodiment, the MSISDN-based IMS service trigger request may be sent to the AS through a SIP Invite message. The Invite message may carry the called MSRN and the calling information such as calling Session Description Protocol (SDP).

306. The AS connects the call to the IP client through a voice gateway (SoftSwitch).

The AS determines that the MSISDN-based IMS service needs to be triggered according to the Invite message sent by the GMSC. Therefore, the AS connects the call to the corresponding IP client according to the calling information in the request. It should be noted that the users who have subscribed to the MSISDN-based IMS service need to set their own IP clients. Therefore, the AS sets a correspondence between the MSISDN and the IP client. When the AS needs to trigger the MSISDN-based IMS service, the AS connects the call from the calling mobile terminal to the IP client corresponding to the called terminal.

307-308. The IP client feeds back a 180 Ring message which is then forwarded to the GMSC.

The IP client feeds back a 180 Ring message which is then fed back to the GMSC through the AS.

309. The GMSC feeds back the ACM to the originating MSC.

After receiving the 180 Ring message, the GMSC converts the 180 Ring message into an ACM and transmits it to the originating MSC transparently.

310. The originating MSC sends an IAM to the RBT platform.

The originating MSC judges whether the SS_Code carries an RBT service identifier. If such is the case, the MSC originates an IAM call to the RBT platform. In this embodiment, it is assumed that the SS_Code carries an RBT service identifier.

311. The RBT platform feeds back an ACM to the originating MSC.

312. The originating MSC plays an RBT to the calling mobile terminal through an ACM.

In this embodiment, it is assumed that the SS_Code carries an RBT service identifier. It is understandable that if no RBT service identifier is carried, the originating MSC does not need to interact with the RBT platform, but needs to play an ordinary ring back tone to the calling mobile terminal directly.

313. The AS sends an Invite message that carries a specific service identifier to the GMSC.

In this embodiment, there are four ring modes in the MSISDN-based IMS service: The mobile terminal and the IP client ring simultaneously; only the mobile terminal rings; only the IP client rings; and the mobile terminal and the IP client ring sequentially. The ring mode in the process described above is: The IP client rings first. If the ring mode set by the user is that only the IP client rings, the mobile terminal ring process is not necessary.

Supposing the ring mode set by the user requires the mobile terminal to ring, the AS needs to send an Invite message that carries the specific service identifier to the GMSC. The specific service identifier is adapted to indicate that the GMSC needs to connect the call to the called mobile terminal directly according to the called MSRN. Particularly, the specific service identifier may be a prefix. For example, a prefix is added before the called number to indicate that the call is not a new call, but a call subsequent to the existing call in the MSISDN-based IMS service.

In this embodiment, the Invite message may further carry a called MSRN.

314. The GMSC connects the call to the called mobile terminal according to the called MSRN.

In this embodiment, the GMSC may connect the call to the called mobile terminal according to the called MSRN stored in step 304, or according to the called MSRN in the Invite message sent by the AS.

315. The called mobile terminal rings, and sends back an ACM.

316-224. The client or the called mobile terminal goes off-hook, and returns a 200 OK message or an ANM to the terminating MSC. The message is forwarded to the calling party, and the call is connected between the calling party and the called party.

In the foregoing embodiment, the IP client rings first, and then the called mobile terminal rings. It is understandable that if the IP client and the called mobile terminal ring simultaneously, step 306 needs to be postponed and executed with step 313 so that the IP client and the called mobile terminal ring simultaneously. However, in order not to affect the user experience of the calling mobile terminal, the RBT needs to be played to the calling mobile terminal through the GMSC and the MSC after completion of step 308.

In the embodiments of the present invention, the terminating MSC receives a call from the calling mobile terminal, determines the HLR of the called party according to the called MSISDN carried in the call, obtains an SS_Code from the HLR, and triggers the MSISDN-based IMS service of the AS according to the MSISDN-based IMS service attribute in the SS_Code; and the AS connects the call to the mobile terminal and/or IP client of the called party through a voice gateway. Therefore, in the embodiments of the present invention, the MSISDN may serve as a unified number; when a calling party dials this MSISDN, the call may be connected to the mobile terminal and/or IP client of the called party according to the setting of the called party, and no new unified number needs to be allocated. Moreover, in the case of dialing the number back, the call can also be connected to the mobile terminal and/or IP client of the called party. Therefore, communications are implemented under different network conditions based on the same number.

Moreover, because the communication capability of the IP client is equivalent to or greater than that of the mobile terminal, the IP client based on the IP network may implement communications in place of the mobile terminal if mobile signals are unavailable or in the case of international roaming.

It should be noted that in the foregoing embodiments, the MSC and the GMSC exist independently. It is understandable that in practice, the MSC and the GMSC may be integrated. That is, the same network element implements both the functions of the MSC and the functions of the GMSC. The specific process is similar, and is not described further.

Figure 4:
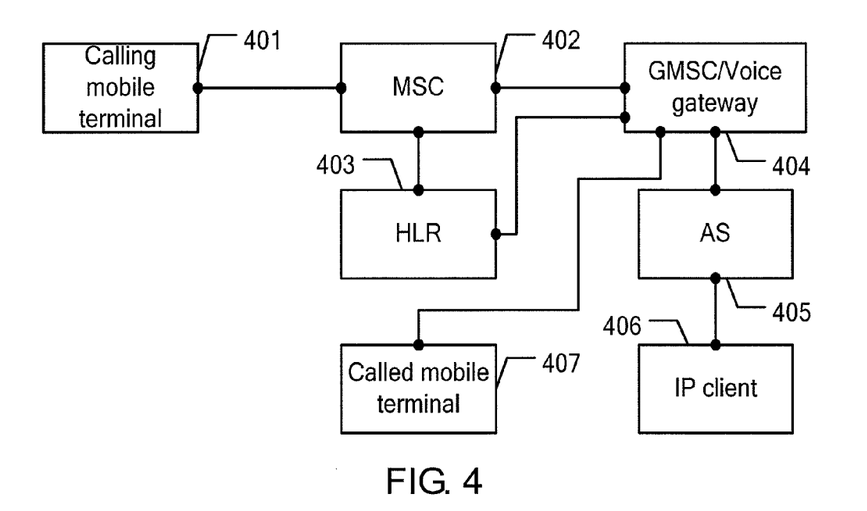
FIG. 4 shows a communication system in an embodiment of the present invention.

A communication system provided in an embodiment of the present invention is described below. As shown in FIG. 4, the communication system includes: a calling mobile terminal 401, an MSC 402, an HLR 403, a GMSC/voice gateway 404, an AS 405, an IP client 406, and a called mobile terminal 407.

The calling mobile terminal 401 is adapted to originate a call to the MSC 402, where the call carries the called MSISDN.

The MSC 402 is adapted to: request an SS_Code from the HLR 403 of the called mobile terminal according to the called MSISDN carried in the call originated by the calling mobile terminal 401, and originate a call to the GMSC/voice gateway 404 according to the MSISDN-based IMS service with the highest priority in the SS_Code.

The HLR 403 is adapted to feed back the SS_Code of the corresponding called terminal to the MSC 402 according to the request sent by the MSC.

The GMSC/voice gateway 404 is adapted to trigger the AS 405 to implement the MSISDN-based IMS service according to the call of the MSC 402.

The AS 405 is adapted to implement the MSISDN-based IMS service as triggered by the GMSC/voice gateway 404.

In this embodiment, the MSC 402 may further play a ring back tone to the calling mobile terminal 401 according to the ring message sent by the GMSC/voice gateway 404.

The GMSC/voice gateway 404 is further adapted to: send a ring message to the MSC 402, and connect the call to the called mobile terminal 407.

The AS 405 may implement the MSISDN-based IMS service by connecting the call to the corresponding IP client 406.

The MSC 402 may further obtain the called MSRN from the HLR 403, and accordingly, the HLR 403 is further adapted to provide the called MSRN for the MSC 402.

The communication system in this embodiment further includes:

an IP client 406, adapted to perform communications according to the connection of the AS 405; and a called mobile terminal 407, adapted to perform communications according to the connection of the GMSC/voice gateway 404.

In the embodiments of the present invention, the terminating MSC receives a call from the calling mobile terminal, determines the HLR of the called party according to the called MSISDN carried in the call, obtains an SS_Code from the HLR, and triggers the MSISDN-based IMS service of the AS according to the MSISDN-based IMS service attribute in the SS_Code; and the AS connects the call to the mobile terminal and/or IP client of the called party through a voice gateway. Therefore, in the embodiments of the present invention, the MSISDN may serve as a unified number; when a calling party dials this MSISDN, the call may be connected to the mobile terminal and/or IP client of the called party according to the setting of the called party, and no new unified number needs to be allocated. Moreover, in the case of dialing the number back, the call can also be connected to the mobile terminal and/or IP client of the called party. Therefore, communications are implemented under different network conditions based on the same number.

Figure 5:
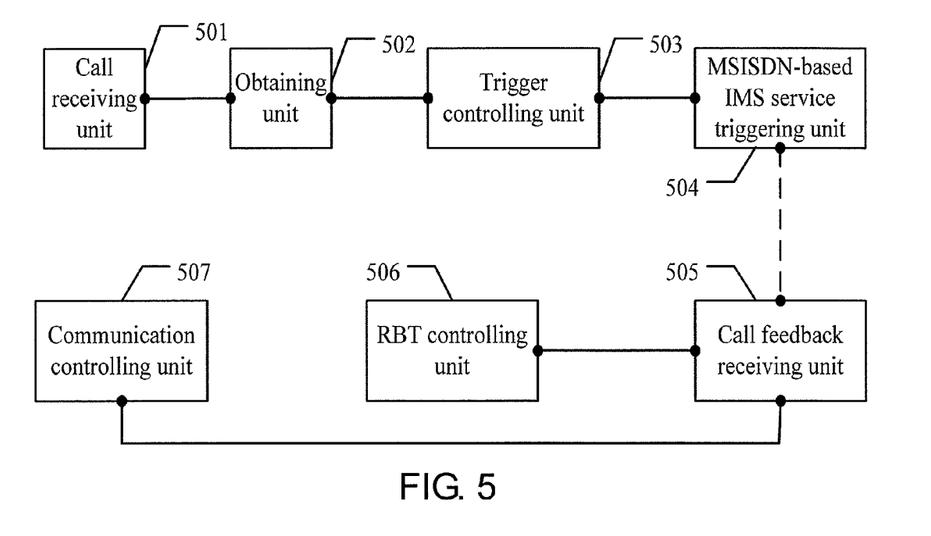
FIG. 5 shows an MSC in an embodiment of the present invention.

FIG. 5 shows an MSC in an embodiment of the present invention. The MSC includes: a call receiving unit 501, an obtaining unit 502, a trigger controlling unit 503, and an MSISDN-based IMS service triggering unit 504.

The call receiving unit 501 is adapted to receive a call originated by a calling mobile terminal, where the call carries an MSISDN of the called terminal.

The obtaining unit 502 is adapted to obtain the corresponding SS_Code and the called MSRN from the HLR of the called party according to the called MSISDN carried in the call received by the call receiving unit 501.

The MSISDN-based IMS service triggering unit 504 is adapted to trigger the MSISDN-based IMS service in the SS_Code according to the called MSRN obtained by the obtaining unit 502.

In this embodiment, the MSC may further include:

a call feedback receiving unit 505, adapted to receive the ring message or 200 OK message fed back by the GMSC after the MSISDN-based IMS service triggering unit 504 triggers the MSISDN-based IMS service;

an RBT controlling unit 506, adapted to trigger the RBT service in the SS_Code according to the ring message received by the call feedback receiving unit 505; and a communication controlling unit 507, adapted to control the calling mobile terminal to communicate with the called mobile terminal according to the 200 OK message received by the call feedback receiving unit 505.

In this embodiment, the MSC may further include:

a trigger controlling unit 503, adapted to determine that the service with the highest trigger priority is the MSISDN-based IMS service according to the SS_Code obtained by the obtaining unit 502.

Figure 6:
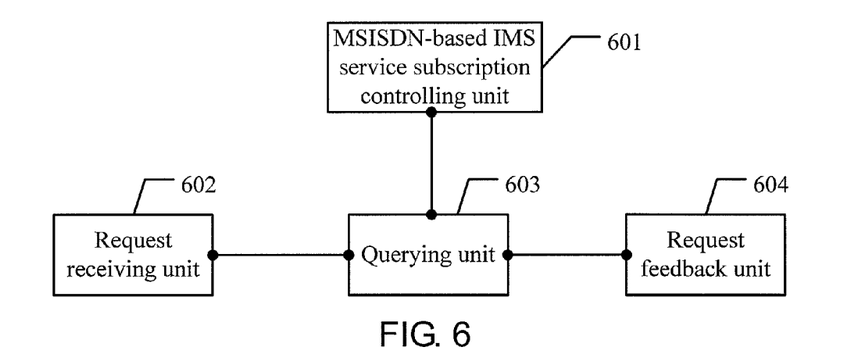
FIG. 6 shows an HLR in an embodiment of the present invention.

FIG. 6 shows an HLR in an embodiment of the present invention. The HLR includes: an MSISDN-based IMS service subscription controlling unit 601, a request receiving unit 602, a querying unit 603, and a request feedback unit 604.

The MSISDN-based IMS service subscription controlling unit 601 is adapted to: subscribe to the MSISDN-based IMS service as required by a user, and set an MSISDN-based IMS service identifier into the SS_Code.

The request receiving unit 602 is adapted to receive a GET request from an MSC, where the GET request carries the called terminal identifier.

The querying unit 603 is adapted to query the corresponding SS_Code and called MSRN according to the called terminal identifier carried in the GET request received by the request receiving unit 602.

The request feedback unit 604 is adapted to feed back the SS_Code and called MSRN found by the querying unit 603 to the MSC.

Figure 7:
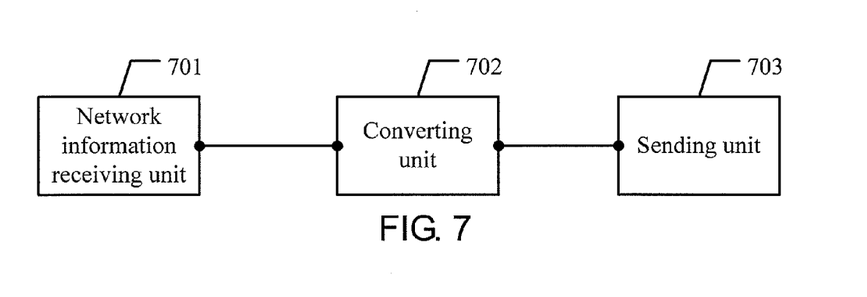
FIG. 7 shows a voice gateway in an embodiment of the present invention.

FIG. 7 shows a voice gateway in an embodiment of the present invention. The voice gateway includes:

a network information receiving unit 701, adapted to receive a network signaling message of a GMSC and/or a SIP message delivered by an AS;

a converting unit 702, adapted to: convert the network signaling message sent by the GMSC into an IP network-based SIP message, and/or convert the SIP message delivered by the AS into a Signaling System Number 7 (SS7) signaling message; and a sending unit 703, adapted to: send the SIP message to the AS through the IP network core device to trigger the MSISDN-based IMS service, and/or send the SS7 signaling message to the MSC of the calling mobile terminal through the GMSC.

It is understandable to those skilled in the art that all or part of the steps of the foregoing embodiments may be implemented by hardware instructed by a program. The program may be stored in a computer-readable storage medium. When being executed, the program performs the following steps:

receiving a call request of a calling terminal, where the call request carries a called terminal number;

querying the HLR of a called terminal according to the called terminal number;

obtaining an SS_Code from the HLR, where the SS_Code carries an MSISDN-based IMS service identifier; and triggering an AS to implement an MSISDN-based IMS service according to the MSISDN-based IMS service identifier.

The storage medium may be a Read-Only Memory (ROM), a magnetic disk, or a compact disk.

Detailed above are a call control method, a communication system, and relevant devices under the present invention. Although the invention is described through several exemplary embodiments, the invention is not limited to such embodiments. It is apparent that those skilled in the art can make modifications and variations to the invention without departing from the spirit and scope of the invention.

What is claimed is:

1. A call control method, comprising:

receiving a call request of a calling terminal, wherein the call request carries a called terminal number;

querying a Home Location Register (HLR) of a called terminal according to the called terminal number;

obtaining a Supplementary Service Code (SS_Code) from the HLR, wherein the SS_Code carries a Mobile Station International ISDN Number (MSISDN)-based IP Multimedia Subsystem (IMS) service identifier;

originating, by a Mobile Switching Center (MSC), a call to a Gateway Mobile Switching Center (GMSC) according to the MSISDN-based IMS service identifier;

triggering, by the GMSC, an Application (AS) to implement an MSISDN-based IMS service according to the call originated by the MSC;

wherein triggering the AS to implement the MSISDN-based IMS service according to the call originated by the MSC comprises:

sending, by the GMSC, an MSISDN-based IMS service trigger request to the AS, wherein the MSISDN-based IMS service trigger request carries information about the calling terminal and the called terminal;

querying, by the AS, an Internet Protocol (IP) client corresponding to the called terminal according to the information about the called terminal; and connecting, by the AS, the call originated by the calling terminal to the IP client according to the information about the calling terminal;

receiving, by the GMSC, a secondary connection request from the AS;

obtaining, by the GMSC, a called Mobile Subscriber Roaming Number (MSRN) through a HLR of calling terminal; and connecting, by the GMSC, the call to the called mobile terminal according to the called MSRN.

2. The method of claim 1, wherein:

the SS_Code further carries Ring Back Tone (RBT) service identifiers;

before the MSC originates the call to the GMSC according to the MSISDN based IMS service identifier, the method further comprises:

obtaining, by the MSC, a priority of an RBT service and a priority of the MSISDN-based IMS service; and determining that the priority of the MSISDN-based IMS service is higher than the priority of the RBT service according to preset service priority parameters, and determining to trigger the MSISDN-based IMS service firstly.

3. The method of claim 2, after the AS connect the call originated by the calling terminal to the IP client, the method further comprises:

receiving, by an originating MSC, a ring message of the IP client from the AS;

interacting, by the originating MSC, with an RBT platform according to the ring message to obtain RBT information, so that the RBT platform plays an RBT to the calling terminal through the originating MSC.

4. The method of claim 1, wherein:

the secondary connection request sent by the AS to the GMSC carries a specific service identifier;

the process of obtaining the called MSRN comprises: sending a GET request to the HLR; and receiving a response which carries the SS_Code and the called MSRN from the HLR;

after the GMSC obtains the called MSRN, the method further comprises: connecting the call to the called mobile terminal directly according to the called MSRN and the specific service identifier in the secondary connection request, without triggering services in the SS_Code any more.

5. The method of claim 1, wherein:

the secondary connection request sent by the AS to the GMSC carries the called MSRN;

the process of obtaining the called MSRN comprises: obtaining the called MSRN from the secondary connection request.

6. A communication system, comprising:

a Mobile Switching Center (MSC), adapted to: request a Supplementary Service Code (SS_Code) from a Home Location Register (HLR) of a called terminal according to a called terminal number carried in a call originated by a calling terminal, and originate a call to a Gateway Mobile Switching Center (GMSC) according to a Mobile Station International ISDN Number (MSISDN)-based IP Multimedia Subsystem (IMS) service identifier in the SS_Code;

the HLR, adapted to feed back the SS_Code of the corresponding called terminal to the MSC according to the request sent by the MSC;

the GMSC, adapted to trigger an Application Server (AS) to implement an MSISDN-based IMS service according to the call of the MSC; and the AS, adapted to implement the MSISDN based IMS service as triggered by the GMSC;

wherein:

the MSC is further adapted to: transmit a ring message to the calling terminal, and play a Ring Back Tone (RBT) to the calling terminal through an RBT platform;

the GMSC is further adapted to: send the ring message to the MSC, and connect the call to a called mobile terminal;

the AS is further adapted to connect the call to a corresponding Internet Protocol (IP) client and send a secondary connection request to the GMSC.

7. A Mobile Switching Center (MSC), comprising:

a call receiving unit, adapted to receive a call originated by a calling terminal, wherein the call carries a called terminal number;

an obtaining unit, adapted to obtain a Supplementary Service Code (SS_Code) from a Home Location Register (HLR) of a called party according to the called terminal number carried in the call received by the call receiving unit; and an MSISDN-based IMS service triggering unit, adapted to trigger a Mobile Station International ISDN Number (MSISDN)-based IP Multimedia Subsystem (IMS) service according to the SS_Code obtained by the obtaining unit;

a call feedback receiving unit, adapted to receive a ring message or an off-hook message;

a Ring Back Tone (RBT) controlling unit, adapted to trigger the RBT service in the SS_Code according to the ring message received by the call feedback receiving unit; and a communication controlling unit adapted to control the calling terminal to communicate with a called terminal according to the off-hook message received by the call feedback receiving unit.

8. The MSC of claim 7, further comprising:

a trigger controlling unit, adapted to determine that a service with a highest trigger priority is the MSISDN-based IMS service according to the SS_Code obtained by the obtaining unit.

* * * * *

UNITED STATES PATENT AND TRADEMARK OFFICE
CERTIFICATE OF CORRECTION

PATENT NO. : 8,335,201 B2  
APPLICATION NO. : 12/823645  
DATED : December 18, 2012  
INVENTOR(S) : Yi et al.

Page 1 of 1

It is certified that error appears in the above-identified patent and that said Letters Patent is hereby corrected as shown below:

In the Claims:

Column 14, Line 16, "Application (AS)" should read -- Application Server (AS) --.

Signed and Sealed this  
Thirtieth Day of April, 2013

Teresa Stanek Rea  
*Acting Director of the United States Patent and Trademark Office*